Dec. 26, 1939.　　　R. A. SANDBERG　　　2,184,652
AUTOMOBILE STEERING AND LOCK ASSEMBLY
Filed Sept. 26, 1938　　　3 Sheets-Sheet 1

Inventor
Ray A. Sandberg.
by Charles Hill
Attys.

Dec. 26, 1939.  R. A. SANDBERG  2,184,652

AUTOMOBILE STEERING AND LOCK ASSEMBLY

Filed Sept. 26, 1938  3 Sheets-Sheet 3

Inventor
Ray A. Sandberg.

Patented Dec. 26, 1939

2,184,652

UNITED STATES PATENT OFFICE 2,184,652

AUTOMOBILE STEERING AND LOCK ASSEMBLY

Ray A. Sandberg, Waukegan, Ill., assignor to Houdaille-Hershey Corporation, Detroit, Mich., a corporation of Michigan Application September 26, 1938, Serial No. 231,713

5 Claims. (Cl. 70—185)

This invention relates to the locking of automobile controls, such as the steering and the ignition or other circuit, and the general object of the invention is to provide an improved, more compact and more efficient assembly of the locking structure relative to the steering control element.

More in detail, an important object of the invention is to provide an improved arrangement in which a locking bolt structure within a stationary lock housing surrounding the steering shaft is shiftable axially in a direction parallel with the steering shaft for engagement with a keeper element which, on release from the locking bolt structure, will permit turning of the steering wheel and shaft.

A further important object is to provide an arrangement in which a shroud frame or shell surrounds the steering column and steering shaft between the steering wheel hub and the instrument board of a vehicle, with the shroud frame secured to the instrument board, and with the lock structure, except for the key receiving extension thereon, entirely enclosed within the shroud frame and secured thereto so as to be protected against displacement from its service position.

Another important object is to construct the shroud frame of upper and lower halves, with the upper half secured to the instrument board and with the lower half detachable for access of authorized persons to the lock structure which is rigidly secured to the upper half.

Still another important object is to provide guard structure for discouraging unlawful removal of the steering wheel and access to the locking structure.

The above enumerated and other important features of the invention are incorporated in the structure disclosed on the drawings, in which drawings:

Figure 5 is a section on plane V—V of Figure 1;

Figure 7 is an end view of the switch box with the terminal cover removed; and

Figure 8 is an end view of the lock housing with the switch box removed.

Figure 1:
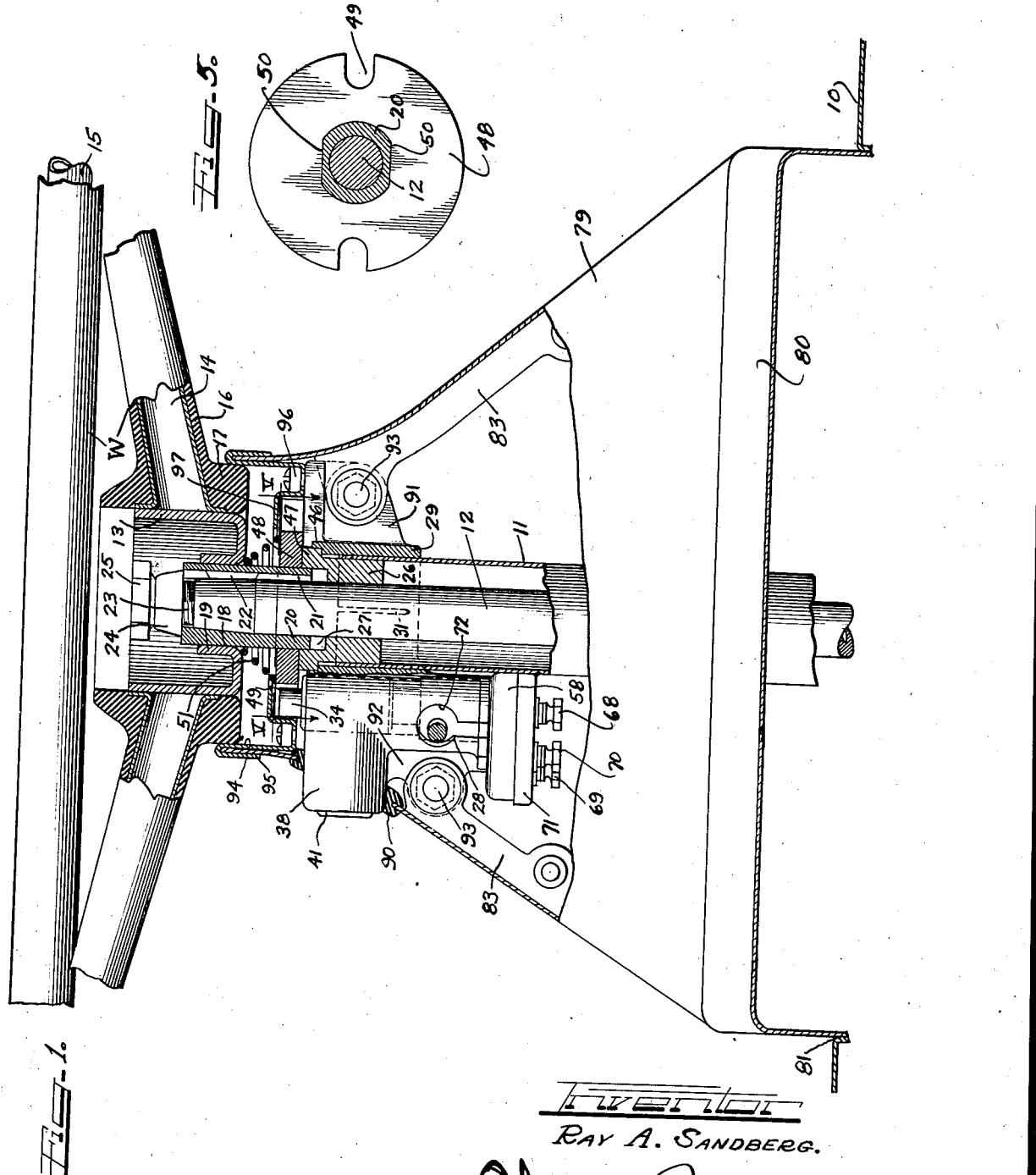
Figure 1 is a plan view of the assembly partly in horizontal diametral section.

On the drawings, 10 represents the instrument board or panel which forms part of the vehicle body, the steering column 11 extending downwardly below the panel to surround the steering shaft 12 which at its upper end supports the steering wheel structure W.

The wheel structure shown comprises a hub core in the form of a sheet metal cup 13 from which extend the tubular spokes 14 to the wheel rim tubular core 15, the spokes being welded to the hub core and the wheel core and these metal parts being coated or encased by suitable non-metallic material or composition 16, the casing portion 17 around the hub core being comparatively thick and of cylindrical shape.

The bottom of the hub core is deflected upwardly to provide the passageway 18 surrounded by the flange 19, a sleeve 20 extending upwardly through the opening 18 to be secured to the flange 19 as by welding. The sleeve 20 receives the upper portion of the steering shaft 12, the end of the shaft being tapered and the sleeve being correspondingly tapered for a wedge interfit, the sleeve having a keyway 21 receiving the key 22 engaging in a suitable recess in the shaft. The shaft has the reduced threaded neck 23 for receiving a nut 24 which when tightened effects secure wedging interengagement of the tapered portions of the shaft and the sleeve, the nut preferably having a shear-off head 25 which is twisted off after tightening of the nut so that the smooth preferably tapered body of the nut will not afford any secure hold for wrenches or other tools.

The steering shaft column 11 terminates a distance below the end of the sleeve 20, and a bushing 26 intimately engages the shaft and the column to hold the shaft and column in concentric alignment. The bushing has the recess 27 in its upper end for receiving the lower end of the sleeve 20, sufficient clearance being left between the bushing and the sleeve so as to permit the sleeve and the wheel to be drawn down sufficiently for the proper wedging engagement of the wheel hub structure with the shaft when the nut 24 is tightened.

The lock structure shown comprises a body 28 having at one side thereof a split cylindrical collar 29 for receiving the steering column 11, a screw or bolt 30 serving to contract the split collar intimately around the column, and the column preferably being provided with a slit 31 so that when the lock collar is clamped in place, the end of the column will be contracted for secure engagement with the bushing 26. The lock body 28 is alongside of the steering column with its axis parallel with the axis of the column and the steering shaft, and the body has the longitudinally extending bore 32 for the lock bolt structure body 33. The lock bolt body has the bore 33' for the lock bolt 34 which is urged outwardly by a spring 35 within the bore, a key 36 engaging in the channel 37 in the lock bolt limiting the axial movement of the bolt. At the upper end of the lock body 28 is the lateral extension or boss 38 having the bore 39 leading to the bore 32, the bore 39 having secured therein the casing 40 of a tumbler lock, the cylinder 41 within the casing being operable by a key and at its inner end having the cam extension 42 for engaging in the cross slot 43 in the lock bolt body 33, so that when the key is turned the lock bolt structure will be shifted axially in the bore 32 to locking or unlocking position.

A pin 44 engaging in the longitudinal channel 45 in the lock bolt body 28 permits axial reciprocation of the lock bolt structure but prevents rotational movement thereof.

The clamping collar 29 of the lock structure has at its upper end the annular recess 46 for receiving the flange 47 at the upper end of the bushing 26, the bushing flange forming a seat for the keeper plate 48 which is provided with one or more locking notches or passages 49 for receiving the end of the lock bolt 34 when the lock structure is shifted into its upper position shown in Figure 1. The keeper disk or plate is secured to rotate with the wheel structure. As shown, the sleeve 20 which forms part of the wheel hub structure has one or more flatted sides 50 for engaging the correspondingly slotted sides of the aperture through the keeper plate, the plate being thus keyed to the hub structure to rotate therewith. Before the wheel is applied to the steering shaft, the keeper plate is slipped onto the sleeve 20, or is placed on the bushing 26 to receive the sleeve 20. In order to hold the keeper plate against the bushing flange, a spring 51 is interposed between the keeper plate and the wheel hub. In some installations, the wheel hub, when applied, may move farther along the shaft 12 than in other installations, but the spring 51 will allow for such variations and will keep the keeper plate properly seated, and furthermore the spring will then prevent rattling of the plate.

When the lock bolt structure 33 is withdrawn by turning of the key, the steering wheel will be free for steering operation. When the key is turned to shift the lock bolt structure upwardly, and a locking opening 49 in the keeper plate is in alignment with the lock bolt 34, the lock bolt will enter the opening and the wheel will be locked against steering movement. Should the wheel be in position so that there will be no locking opening 49 in alignment with the lock bolt 34, the lock bolt will be held abutted against the bottom of the keeper plate by the spring 35 and then upon turning of the wheel to bring one of the locking openings 49 into alignment with the lock bolt, the lock bolt will snap into the opening for locking of the wheel.

Besides locking the steering, it may also be desirable to lock other controls, as, for example, electrical circuits such as the ignition circuit. I therefore provide switching means on the lock structure operable by a switch lever 52. This switch lever extends from a collar 53 rotatable in the lower end of the bore 32 in the lock body. At its lower end the collar 53 has tongues 54 extending therefrom and a switch actuating plate 55 has openings 56 for receiving the tongues and to extend diametrally across the lower end of the collar, the plate at one end having a downwardly extending finger 57.

The switch parts are contained within a switch box 58 detachably secured with its bottom against the lower end of the lock body 28, as by screws 59. Within the switch box is a switch block 60 mounting a switch blade 61, the blade shown being triangular and having three contact beads 62, 63, and 64, the block being pivoted to a suitable pivot projection 65 on the switch box bottom. The switch box has the slot 66 through which the finger 57 of the switch blade 55 passes for engagement in the recess 67 in the back of the switch block 60, so that when the collar 53 is rotated by its lever 52, the switch block will be swung for locating the switch blade relative to terminal contacts. Three terminal contacts are shown extending from the terminal posts 68, 69, and 70 on the cover 71 for the switch box, the screws 59 holding the cover to the switch box. The terminal 68 would be connected with a source of current supply such as a battery, while the terminal 69 would be connected with the ignition coil, and the other terminal 70 might connect with some other electrical instrument or gauge on the instrument board. The lock body 28 has a circumferentially extending slot 72 through which the switch lever 52 extends, the lever terminating in knob 73. A spring pressed ball 74 engageable in depressions 75 in the switch lever collar 53 will yieldably hold the collar in either its switch opening or switch closing position.

Figure 4:
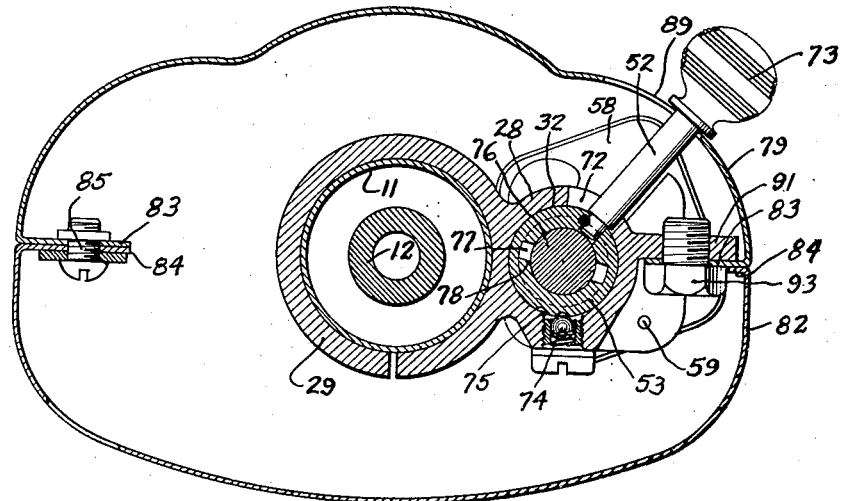
Figure 4 is an enlarged section on plane IV—IV of Figure 2.
Figure 6:
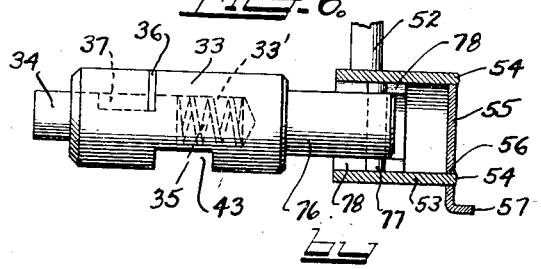
Figure 6 is a side elevation of the lock bolt structure and the hub of the switch lever in diametral section.

As best shown by Figures 4 and 6, the switch lever collar receives the reduced end 76 of the lock bolt body 33, a cross pin 77 carried by the extension engaging in longitudinal channels 78 in the collar for locking the collar and thereby preventing opening of the switch when the lock bolt structure is in steering locking position. However, when the lock bolt structure is shifted to unlocking position, the cross pin will leave the channel 78 and enter the lower, larger diameter part of the collar bore, so that the switch lever may now rotate the collar for closing or opening of the switch. When the switch is in open position, the channels 78 will be out of alignment with the pin 77, so that the bolt structure cannot be shifted to steering locking position, and the switch must first be opened before steering locking can be accomplished.

Figure 2:
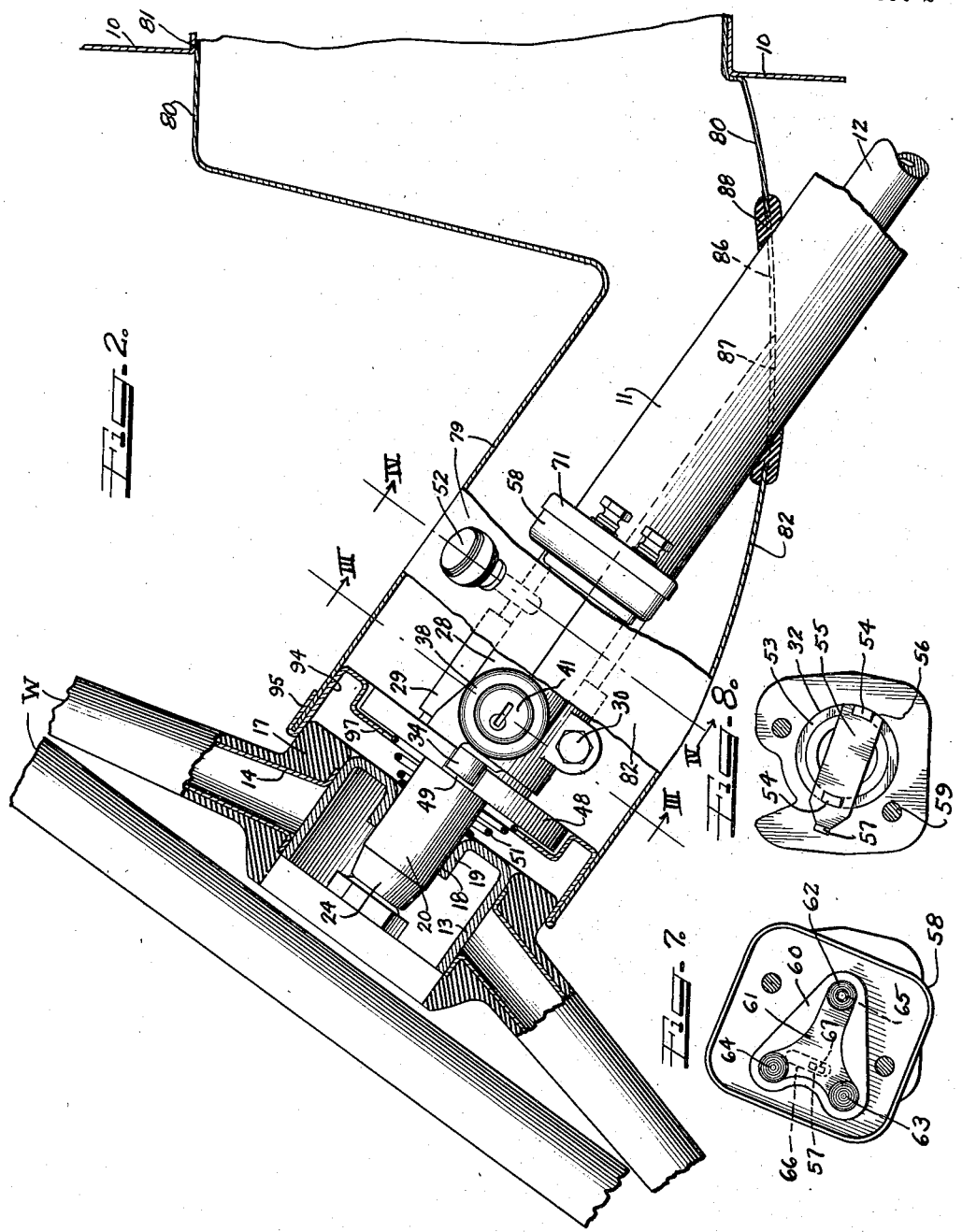
Figure 2 is a side elevation of the assembly partly in vertical diametral section.

The end portion of the steering column and the lock structure thereon are surrounded by a bracket shell or shroud structure 79. This shroud structure, as shown, has an upwardly extending rectangular base portion 80 fitting into an opening 81 in the front wall of the instrument panel 10, the base portion being secured, preferably by welding. The outer end of the shroud structure is cylindrical to receive the inner end of the hub casing 17 of the wheel structure. In order that assembly of the automobile body chassis may be readily accomplished, the shroud structure is provided with a detachable bottom 82. The edge portions of the shroud body 79 and the bottom 82 are deflected inwardly to provide seating flanges 83 and 84 respectively which may be conveniently secured together as by bolts 85 to detachably hold the bottom or cover part 82 in place, as clearly shown on Figure 4. The bottom wall of the shroud base 80 has the semi-circular opening 86 for registering with the semi-circular opening 87 in the bottom or cover 82, these openings accommodating the steering column 11, and a sealing thimble or bushing 88 of material such as rubber may be inserted in the opening around the steering column, as clearly shown on Figure 2.

Figure 3:
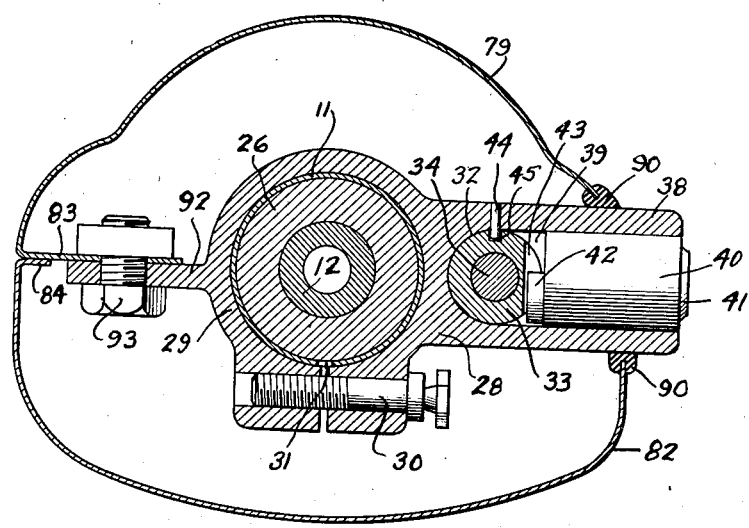
Figure 3 is an enlarged section on plane III—III of Figure 2.

The shroud body has the slot 89 through which the switch lever 52 extends, and the shroud body and the shroud bottom 82 have complementary openings to form a passageway through which extends the lock structure boss 38 in which the tumbler lock is housed for manipulation by a key from the exterior of the shroud. The passageway may be lined by a thimble or bushing 90, Figures 1 and 3.

For securing the lock structure to the shroud body 79, webs 91 and 92 are provided on the lock frame to be secured to the flanges 83 on the shroud body as by means of bolts or screws 93.

To prevent tampering with the keeper plate 48 and the lock bolt structure, a guard or cover 94 is provided for the outer end of the shroud structure. As shown, this cover or cap is formed of sheet metal and is of cup shape to extend into the cylindrical outer end of the shroud, the outer portion of the cover being deflected to form a rim or flange 95 between which and the cover body the outer cylindrical end of the shroud structure is received. The cover is secured to the lock frame as by screws 96. The inner portion of the bottom of the cover is deflected outwardly to form an annular recess for receiving the keeper plate 48 and to provide an annular flange 97 to overhang the keeper plate 48 and the lock bolt receiving notches openings 49 therein.

With my improved arrangement, the compact lock structure is entirely within the shroud structure and rigidly secured thereto and to the steering column. The lock is primarily clamped to the steering column, and then when the automobile body is applied to the chassis, the shroud body 79 engages around the lock structure which is then secured to the shroud by the bolts 93. The shroud bottom 82 is then applied for entire enclosure of the lock structure except for the protruding cylinder lock supporting boss 38 and the switch actuating lever 52. The shroud cap structure 94 further secures the lock structure against displacement and protects the lock bolt and the lock bolt keeper plate against tampering.

I have shown a practical and efficient embodiment of the various features of my invention, but I do not desire to be limited to the exact construction, arrangement, and operation shown and described, as changes and modifications may be made without departing from the scope of the invention.

I claim as follows:

1. In combination, a steering shaft and a steering wheel secured thereto, a lock structure comprising a body stationarily mounted adjacent to the steering shaft and the wheel hub structure, a lock bolt shiftable in said lock body in a direction parallel with the steering shaft, a keeper plate between the lock body and the wheel hub and having openings for receiving the lock bolt, said keeper plate being splined to the hub structure, and spring means between the keeper plate and the hub for holding said plate in position for cooperation with the lock bolt.

2. In combination, a steering shaft and a steering wheel thereon, a lock structure comprising a body stationarily mounted adjacent to the steering shaft and the steering wheel, a lock bolt shiftable in said lock body in a direction parallel with the steering shaft, a keeper plate between said lock body and wheel provided with openings for receiving the projected lock bolt, a sleeve forming part of the steering wheel hub structure to which said keeper plate is splined for rotation with the wheel structure, and spring means for holding said keeper plate in position for co-operation with said lock bolt.

3. In combination, a steering shaft and a steering wheel thereon, a lock structure comprising a body stationarily mounted adjacent to the steering shaft and wheel structure, a lock bolt shiftable in said lock body alongside of and in a direction parallel with the steering shaft, a sleeve extending from the wheel hub structure, a keeper plate between the lock body and the hub structure having spline connection with said sleeve, said keeper plate having openings for receiving the projected end of the lock bolt for thereby locking the wheel structure and shaft against steering operation, a spring holding said plate against the lock body and a guard frame overhanging said keeper plate for preventing access to the locking bolt through the plate openings.

4. In combination, a steering column having a steering shaft extending therethrough and a steering wheel secured to the upper end of the shaft, a lock structure comprising a body stationarily mounted on said steering column adjacent to the steering wheel hub, a lock bolt shiftable in said lock body in a direction parallel with the steering shaft, a keeper plate between said lock body and the wheel hub provided with openings for receiving the projected lock bolt, a sleeve secured to the steering wheel hub to which said keeper plate is splined for rotation with the wheel structure and shaft, and yielding means between said plate and the hub structure for holding said plate in bolt receiving position during any axial movement of said hub and sleeve relative to said plate.

5. In combination, a steering shaft and a steering wheel thereon, a lock structure comprising a body stationarily mounted adjacent to the steering shaft and the steering wheel hub, a lock bolt shiftable in said lock body in a direction parallel with the steering shaft, a keeper plate between said lock body and the wheel hub provided with openings for receiving the projected lock bolt, a sleeve secured to the wheel hub to which said keeper plate is splined for rotation with the wheel structure, and a guard frame comprising a base portion secured to the lock body and overhanging said plate and a cylindrical wall for receiving the lower end of the wheel hub, said guard frame preventing access to the locking bolt.

RAY A. SANDBERG.